United States Patent
McHugh et al.

(10) Patent No.: US 10,185,634 B2
(45) Date of Patent: Jan. 22, 2019

(54) DETECTING DATA LOSS AND CORRUPTION OF DATA PROCESSED BY A DATA PROCESSING SYSTEM OF AN ONLINE SYSTEM DURING A SPECIFIED TIME INTERVAL

(71) Applicant: Facebook, Inc., Menlo Park, CA (US)

(72) Inventors: Jason George McHugh, Seattle, WA (US); Nickolay Vladimirov Tchervenski, Bothell, WA (US); Qunshu Zhang, Sammamish, WA (US)

(73) Assignee: Facebook, Inc., Menlo Park, CA (US)

( * ) Notice: Subject to any disclaimer, the term of this patent is extended or adjusted under 35 U.S.C. 154(b) by 206 days.

(21) Appl. No.: 15/258,987

(22) Filed: Sep. 7, 2016

(65) Prior Publication Data

US 2018/0067821 A1    Mar. 8, 2018

(51) Int. Cl.
*G06F 11/14* (2006.01)
*G06Q 50/00* (2012.01)

(52) U.S. Cl.
CPC ...... *G06F 11/1469* (2013.01); *G06F 11/1451* (2013.01); *G06F 11/1471* (2013.01); *G06F 11/1474* (2013.01); *G06Q 50/01* (2013.01)

(58) Field of Classification Search
CPC ........... G06F 11/1471; G06F 17/30371; G06F 11/1435; G06F 11/1004; G06F 11/1048; G06F 11/1056; G06F 11/1446; G06Q 50/01
See application file for complete search history.

(56) References Cited

U.S. PATENT DOCUMENTS

| | | | |
|---|---|---|---|
| 6,502,133 B1 * | 12/2002 | Baulier | G06F 9/542 709/224 |
| 7,565,661 B2 * | 7/2009 | Sim-Tang | G06F 11/1471 714/48 |
| 9,606,877 B2 * | 3/2017 | McHugh | G06F 11/1471 |
| 2010/0235681 A1 * | 9/2010 | Suetsugu | G06F 11/1471 714/15 |
| 2010/0293532 A1 * | 11/2010 | Andrade | G06F 11/1438 717/140 |
| 2013/0166517 A1 * | 6/2013 | Saliba | G06F 17/30371 707/691 |
| 2014/0149583 A1 * | 5/2014 | Gil | H04L 67/22 709/224 |
| 2014/0317448 A1 * | 10/2014 | Rash | G06F 11/1446 714/15 |

(Continued)

*Primary Examiner* — Yolanda L Wilson
(74) *Attorney, Agent, or Firm* — Fenwick & West LLP

(57) ABSTRACT

An online system processes data in a distributed processing system. To detect loss and corruption of data, the online system periodically stores information describing states of data processed during various time intervals and updates the information to include changes occurring within a predetermined period. Based on states of data described by information stored at a time, the online system performs a modified process on data received or processed during a time interval. For each item of data on which the modified process was performed, the online system compares a modified state of the data item to a state described by information stored at an additional time to determine if data was lost or corrupted. Lost or corrupted data is identified and processed based on the state of data described by the information stored at the time.

20 Claims, 3 Drawing Sheets

(56) References Cited

U.S. PATENT DOCUMENTS

| | | | |
|---|---|---|---|
| 2014/0344172 A1* | 11/2014 | Ansari | G06Q 10/06 705/311 |
| 2014/0351005 A1* | 11/2014 | Kohinata | G06Q 50/01 705/7.29 |
| 2016/0110406 A1* | 4/2016 | Zircher | G06F 17/30371 707/690 |
| 2016/0147799 A1* | 5/2016 | Cohen | G06N 99/005 706/12 |

* cited by examiner

DETECTING DATA LOSS AND CORRUPTION OF DATA PROCESSED BY A DATA PROCESSING SYSTEM OF AN ONLINE SYSTEM DURING A SPECIFIED TIME INTERVAL

BACKGROUND

This disclosure relates generally to online systems, and more specifically to processing data received at a data processing system of an online system.

Online systems, such as social networking systems, allow users to connect to and to communicate with other users of an online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Additionally, many online systems commonly allow publishing users (e.g., businesses) to sponsor presentation of content on an online system to gain public attention for a publishing user's products or services or to persuade other users to take an action regarding the publishing user's products or services. Content for which the online system receives compensation in exchange for presenting to users is referred to as "sponsored content." Many online systems receive compensation from a publishing user for presenting online system users with certain types of sponsored content provided by the user. Frequently, online systems charge a publishing user for each presentation of sponsored content to an online system user or for each interaction with sponsored content by an online system user. For example, an online system receives compensation from a publishing user each time a content item provided by the publishing user is displayed to another user on the online system or each time another user is presented with a content item on the online system and interacts with the content item (e.g., selects a link included in the content item), or each time another user performs one or more particular actions after being presented with the content item (e.g., visits a website or physical location associated with the user who provided the content item).

An online system that provides content to its users in exchange for compensation from a user (i.e., sponsored content) may provide a publishing user who provided content to the online system with various metrics describing certain actions performed by other users of the online system after being presented with such sponsored content to describe the effectiveness of the sponsored content at eliciting the certain actions. For example, an online system presents users with a content item and maintains a number of users who select a link included in the content item or a number of times the users visit a web site associated with the content item during a particular time interval based on information received from client devices on which users interact with the content item. Based on the number of users who selected a link included in the content item or a number of times the users visited the website associated with the content item after being presented with the content item, the online system determines a metric and includes the metric in a report describing the content item's effectiveness that is provided to a publishing user associated with the content item.

Determining metrics describing actions performed by users of an online system often involves performing complex, resource-intensive operations on large amounts of data in short periods of time to accurately extract, analyze and process information necessary for the production of meaningful reports. For example, to effectively generate metrics describing events associated with various content items presented on an online system during various time intervals, the online system quickly and accurately receives, formats, reads, analyzes, organizes, aggregates, stores, and presents the required information for various events, content items, and time intervals. To efficiently process the vast amount of information required to generate such metrics, online systems often use data processing systems capable of processing an incoming stream of data in a short amount of time. For example, a data processing system includes a network of data processing elements that perform a series of operations in a distributed manner among the various data processing elements to quickly process incoming data. A data processing system may include components operating on different computing devices and in different locations in various implementations.

However, in some circumstances, data received at a data processing system may be lost or erroneously altered by the data processing system before or during processing, causing inaccurate determination of metrics. For example, a data processing system having multiple data processing elements each performing a specified process on individual pieces of data as a data analysis process is applied to the data loses a piece of data (e.g., a data processing element fails to process the piece of data due to power failure or logic error) during processing. If data is lost or erroneously altered (i.e., "corrupted") by the data processing system and the loss or alteration is not detected, metrics based on the data may be incomplete or inaccurate. For example, if the online system performs a series of additive operations on data being processed by a data processing system to measure a number of times a user interacts with a particular content item after being presented with the content item, the measurement is inaccurately low if data describing user interactions with the content item is lost or corrupted by the data processing system during processing. Accordingly, metrics based on such data will also be inaccurately low if the online system does not detect and correct for the lost or corrupted data when determining the metrics. Hence, undetected loss or corruption of data by a data processing system of the online system may cause an online system to generate metrics that inaccurately describe performance of various content items presented on the online system.

SUMMARY

An online system receives data describing an occurrence of certain events associated with content items presented to online system users and performs a data analysis process comprising one or more operations to analyze the data in a data processing system. For example, the online system receives data describing interactions between online system users and a content item created by an additional user of the online system and performs the data analysis process on the data as the data is received at a distributed data processing system (e.g., a data processing pipeline) of the online system. Data describing events associated with presented content items may be received in an arbitrary order from various sources external to the online system (e.g., an advertisement server, a game server, a mail server, a content provider, etc.) or internal to the online system. For example, received data describes interactions between online system users and content items presented to the online system users by the online system or presented to the online system users by a content provider external to the online system.

The data analysis process performed on the received data comprises various operations that may be executed by one or more components of a data processing system at the online system. Example operations performed by the data processing system include: validating data, converting data, organizing data, summarizing data, aggregating data, interpreting data, presenting data, and storing data. Operations performed by the data processing system may be distributed among various components of the data processing system, which may operate on different computing devices or in different locations. In some embodiments, the data processing system is a data processing pipeline that performs the data analysis process in real time (i.e., as it is received at the online system) to expedite processing of the data. After the data analysis process is applied to the data, the online system may store the results of applying the data analysis process to the data for further processing or querying. For example, the online system generates various reports based on the results of applying various operations of the data analysis process to the data, such as metrics describing the performance of content presented on the online system.

In various embodiments, the online system performs the data analysis process to analyze the received data during various processing time intervals and stores a set of information at a time describing states of various items of data ("data items") on which at least a threshold amount of the data analysis process was performed. For example, the stored set of information includes an identifier of a data item on which at least a threshold portion of the data analysis process was performed and a value associated with the data item at a time when the set of information was stored. Hence, the set of information identifies values associated with various data items by the data analysis process at the time when the set of information was stored. While a value associated with a data item may differ as different portions of the data analysis process are performed on the data item, the set of information identifies the value associated with the data item at the time when the set of information was stored. In some embodiments, the online system periodically stores sets of information describing states of various data items on which at least the threshold amount of the data analysis process was performed during a particular processing time interval. For example, the online system stores a set of information at 12-hour intervals describing states of various data items on which at least a threshold amount of the data analysis process was performed during a 12-hour processing time interval prior to the time when the online system stores the set of information.

Information included in the set of information stored by the online system at the time includes an identifier of a data item, a timestamp specifying when the online system received the data item, a timestamp specifying when the set of information was stored, a portion of the data analysis process performed on the data item at the time when the set of information was stored, a value associated with the data item at the time when the set of information was stored, and a copy of the data item at the time when the set of information was stored, in some embodiments. For example, the set of information describes a state of each data item received during a processing time interval for which at least a threshold portion of the data analysis process was performed during the processing time interval. In some embodiments, information in the set of information may describe a state of one or more data stores of the online system after the data analysis process was fully applied to at least one data item that was received during the processing time interval prior to the time when the set of information was stored and the at least one data item is stored in a data store.

To account for variations in an amount of time it takes the data processing system to process a data item, the online system updates the stored set of information in response to determining a change in the state of a data item that the online system received prior to storing the set of information relative to the state of the data item described by the set of information. For example, if the data analysis process is being performed on a data item at a time when the set of information is stored and the state of the data item is absent from the set of information, the online system updates the set of information to include the state of the data item. As another example, if the data analysis process is being performed on the data item at the time when the set of information is stored and the state of the data item when the data analysis process is completed on the data item differs from the state of the data item in the set of information, the online system updates the set of information to include the state of the data item after the data analysis process has completed. In various embodiments, the online system updates the set of information to include a changed state of a data item if the state of the data item changed within a threshold amount of time after the time when the set of information was stored. Hence, in various embodiments, the online system periodically stores a set of information describing states of various data items when all data items that the online system received during a processing time interval prior to a time when the online system stores the set of information have been processed at least a threshold amount by the data processing system.

The online system also stores an additional set of information at an additional time that is later than the time when the set of information describing the state of each data item on which at least the threshold portion of the data analyzing process was performed during the processing time interval was stored. Information included in the additional set of information may include an identifier of a data item, a timestamp specifying when the online system received the data item, a storage timestamp specifying the additional time when the additional set of information was stored, a portion of the data analysis process performed on the data item at the additional time when the additional set of information was stored, and a copy of the data item at the additional time, in some embodiments. For example, the additional time is a specified time interval after the time the set of information was stored by the online system. In some embodiments, the specified time interval after the time the set of information was stored by the online system corresponds to an additional processing time period during which further operations of the data analysis process are applied to the data processed during the additional processing time interval (e.g., in a subsequent segment of a data processing pipeline). Hence, the set of information and the additional set of information describe states of the data items at different times, allowing the online system to maintain information describing different states of data items processed by the data analysis process over a period of time.

In various embodiments, the online system identifies a group of data items on which the data analysis process was performed during a processing time interval between the time when the set of information was stored and the additional time when the additional set of information was stored. For example, if the online system detects an error in the data analysis process affecting a state of one or more data items on which the data analysis process was performed between the time and the additional time, the online system identifies a group of data items processed between the time and the additional time based at least in part on the stored information, modifies the data analysis process to correct the detected error, and performs the modified data analysis process on the group of data items. In some embodiments, the online system retrieves the state of each data item of the group of data items from the stored set of information and performs the modified data analysis process on each data item of the group based on the state of each data item described by the retrieved set of information. In some embodiments, the online system identifies an additional group of data items described by the set of information that are not described by the additional set of information and performs the modified data analysis process on the identified additional group data items. This allows the online system to perform the modified data analysis process on data items that the data processing system did not process between the time and the additional time (e.g., data items that were lost by the data processing system). Hence, the online system may determine the data analysis process was not performed on the additional group of data items having a state identified by the set of information but not having a state identified by the additional set of information and perform the modified data analysis process on the additional group of data items, which were not processed by the data analysis process.

For each data item on which the online system performed the modified data analysis process, the online system stores additional information describing a modified state of the data item after the modified data analysis process is performed, or after at least a threshold portion of the modified data analyzing process is performed, in various embodiments. The modified set of information may include an identifier of a data item, a timestamp describing when the online system received the data item, a storage timestamp describing when the modified set of information was stored, a portion of the modified data analysis process performed on the data item when the modified set of information was stored, and a copy of the data item when the modified set of information was stored, in some embodiments. Hence, the modified set of information describes a modified state of one or more data items on which the modified data analysis process was performed. If the modified data analysis process was performed on an additional group of data items described by the set of information and not described by the additional set of information, the online system also stores an additional modified set of information describing a modified state of each data item of the additional group of data items on which at least a threshold portion of the modified data analysis process was performed. Alternatively, the online system includes information describing the modified state of the additional group of data items in the modified set of information, in some embodiments.

To determine whether data was lost or corrupted when the data analysis process was performed on data items between the time and the additional time (e.g., if an error in the data analysis process occurred during a processing time interval between the time and additional time was detected), the online system compares the state of each data item of the group of data items described by the additional set of information and the modified state of the data item described by the modified set of information and determines whether the state and the modified state differ. Similarly, the online system compares the state of each data item of the additional group of data items described by the additional set of information and the modified state of the data item described by the additional modified set of information to determine whether the state and the modified state differ, in some embodiments. For example, the online system compares a value associated with a state of a data item described by the additional set of information to an alternative value associated with the modified state of the data item described by the modified set of information and determines whether the value associated with the state differs from the alternative value associated with the modified state.

In some embodiments, the online system generates a pairing that associates information identifying a data item with a difference between the state of the data item described by the additional set of information and the modified state of the data item described by the modified set of information. For example, if a value associated with a data item by the data analysis process at the additional time and an alternative value associated with the data item by the modified data analysis process differs by a value of two, the online system associates the value of two with an identifier for the data item. In some embodiments, the online system updates the state of each data item of the group of data items on which performance of the modified data analysis process resulted in a modified state differing from a state identified by the additional set of information based on the pairings associating information identifying data items with differences between states and modified states of the data items. For example, the online system alters the state of a data item described by the additional set of information by a difference associated with an identifier of the data item in a pairing. Hence, pairing the difference with an identifier of a data item allows the online system to correct for an error in the data item's state arising from performing the data analysis process during a processing time interval between the time and the additional time.

In some embodiments, the online system retrieves stored information describing a later state of each data item of the group of data items after the additional time and applies a difference associated with each data item to the later state of the data item to correct errors in the later state of the data item from a discrepancy between the state at the additional time and the modified state as the data item was further processed by the data processing system. In other embodiments, the online system performs one or more data analysis processes on the difference associated with identifiers of each data item of the group of data items and applies the result of the data analyses processes to a state of each data item (e.g., after the data item has been fully processed by the data processing system) to correct the state of the data item. Hence, the online system detects loss and corruption of data occurring from performing the data analysis process during a particular processing time interval, identifies lost and corrupted data items, and corrects errors in the states of the identified data items.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
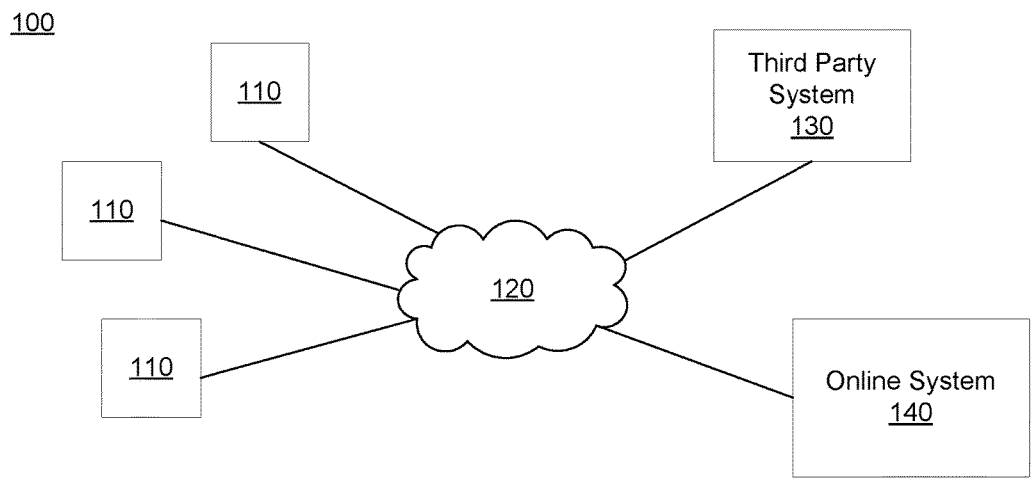
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The online system 140 may be a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the online system 140, such as advertisements, content, or information about an application provided by the third party system 130.

In some embodiments, one or more of the third party systems 130 provide content to the online system 140 for presentation to users of the online system 140 and provide compensation to the online system 140 in exchange for presenting the content. For example, a third party system 130 provides content items to the online system 140 for presentation to online system users and provides amounts of compensation to the online system 140 in exchange for presenting content items to the online system users. Content for which the online system 140 receives compensation in exchange for presenting is referred to herein as "sponsored content." Sponsored content from a third party system 130 may be associated with the third party system 130 or with another entity on whose behalf the third party system 130 operates.

Figure 2:
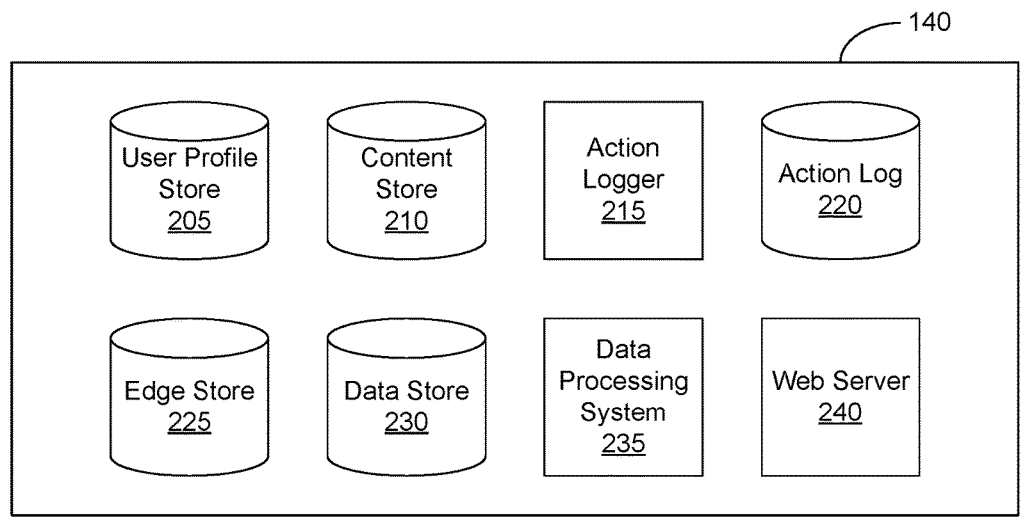
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a data store 230, a data processing module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity. In some embodiments, the brand page associated with the entity's user profile may retrieve information from one or more user profiles associated with users who have interacted with the brand page or with other content associated with the entity, allowing the brand page to include information personalized to a user when presented to the user.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications, such as third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also includes a landing page specifying a network address to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), engaging in a transaction, viewing an object (e.g., a content item), and sharing an object (e.g., a content item) with another user. Additionally, the action log 220 may record a user's interactions with content items on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, content that was engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features that each represent characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or a particular user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The data store 230 stores data items (e.g., data packets) received by the online system 140 from third party systems 130 (e.g., an ad server, a game server, a mail server and/or web server), client devices 110, or generated by components of the online system 140. Hence, the online system 140 receives data items from sources internal to or external to the online system 140. In various embodiments, data received by the online system 140 comprises individual data items that each describes an occurrence of certain events. The online system 140 stores the data items in the data store 230 along with additional information describing the data items. For example, each data item comprises a header that includes information describing a sender of the data item, a time when the data item was sent to the online system 140 and a format of the data item; further each data item comprises a body that includes information describing an occurrence of an event and a trailer that includes instructions for processing the data item at the online system 140.

Events described by data items in the data store 230 include events associated with a user profile on the online system 140 of a user, such as interactions between users of the online system 140 and content items presented to the users by the online system 140. In various embodiments, information stored in the data store 230 along with a data item describes one or more of: a time the data item was received, an online system user associated with the data item, a content item associated with the data item, and formatting information (e.g., a state of the data item) at the time the data item is stored. For example, the online system 140 generates a unique data item identifier describing each data item and a timestamp describing a time when the online system 140 received the data item. The online system 140 stores the data item identifier and timestamp in the data store 230.

As described in more detail below in conjunction with FIG. 3, the online system 140 may also store various sets of information in the data store 230 describing states of data items processed by a data processing system of the online system 140, in various embodiments. For example, a set of information stored in the data store 230 includes an identifier of a data item, a timestamp describing when the online system 140 received the data item, a timestamp describing when the information was stored, a portion of a data analysis process performed on the data item by the data processing system when the information was stored, a value associated with a state of the data item by the data processing system when the information was stored, and a copy of the data item when the information was stored. The online system 140 may also store various additional sets of information and modified sets of information describing additional states of data items and modified states of data items processed by a data processing system of the online system 140 in the data store 230.

In some embodiments, a set of information stored in the data store 230 describes a state of the data store 230 after the data analysis process was fully applied to at least one data item that was received during a processing time interval prior to the time when the set of information was stored and the at least one data item is stored in a data store 230. In various embodiments, the online system 140 stores data items in the data store 230 when the online system 140 receives the data items and again stores data items in the data store 230 when an event occurs or at various intervals of time as the data items are processed by the data processing system. For example, the online system 140 stores a data item in the data store 230 at a time when the data item is received and updates information stored in data store 230 after the data item has been processed by one or more data processing elements of a data processing system, so the data store 230 includes the data item in one or more states where the data analysis process has been fully or partially applied to the data item by the data processing system. Hence, data items are stored in the data store 230 in various states corresponding to processing of the data items by the online system 140.

In some embodiments, the online system 140 generates copies of the data store 230 (e.g., upon the occurrence of an event or at various pre-determined time intervals) to archive various states of the data items. In certain embodiments, the online system 140 retrieves copies of the data store 230 and compares the copies to identify data items lost or erroneously altered during a time interval in which a data processing system of the online system 140 performs the data analysis process on the data items. For example, the online system 140 compares a copy of the data store 230 generated at a time when all data items received before the time have been stored with an additional copy of the data store 230 generated at an additional time when all data items received before the time have been processed at least a threshold amount by the data processing system and identifies data items included in copy of the data store 230 but not in the additional copy as lost data items.

The data processing system 235 performs a data analysis process comprising one or more operations to process data items received by the online system 140. For example, the data processing pipeline 235 accesses, reads, analyzes, validates, formats, organizes, or stores data items received by the online system 140 and stored in the data store 230 to extract and process information included in the data items for use by the online system 140. Operations performed by the data processing system 235 may be performed in a distributed manner among a plurality of various data processing elements or other components of the data processing system 235 (e.g., by a data processing pipeline).

In various embodiments, different data processing elements of the data processing system 235 may operate on different computing devices and in different locations. Multiple data items may be simultaneously processed by the data processing system 235 as they are received (e.g., in real time) by the online system 140 in some embodiments. Alternatively the data processing system 235 processes data items upon the occurrence of an event (e.g., a request or query) or at various pre-determined time intervals. In various embodiments, the data processing system 235 processes data items in a manner where an order in which the data items are received and processed by the data processing system 235 does not influence processed states of various data items, also referred to herein as processing data items in "an additive manner."

In certain embodiments, a data processing system 235 comprises a data processing pipeline comprising an input, an output, and a plurality of various data processing elements coupled in series with each other. The input is coupled to a data processing element, and the output of the data processing element is coupled to an input of another data processing element or to an output of the data processing pipeline. Any number of data processing elements may be coupled together in series to form a data processing pipeline in various embodiments. Hence, a data item received at the input of a data processing pipeline passes through various data processing elements, which perform one or more operations on the data item, until reaching the output of the data processing pipeline. Different data processing elements perform one or more operations on a data item processed by the data processing system 235. Example operations performed by a data processing element include: validating, converting, organizing, summarizing, aggregating, interpreting, presenting and/or storing a data item.

In various embodiments, the data processing system 235 stores sets of information describing states of various data items on which the data processing system 235 performed at least a threshold amount of a data analysis process during one or more processing time intervals. For example, a stored set of information includes an identifier of a data item and a value associated with the data item by the data processing system 235 based at least in part on a state of the data item when the information is stored or a state of the data item when the data processing system 235 performs at least a threshold amount of a data analysis process on the data item. While a value associated with a data item may differ as different portions of the data analysis process are performed on the data item, a stored set of information identifies the value associated with the data item at a time when the information was stored. In some embodiments, the data processing system 235 periodically stores sets of information to describe states of various data items on which at least a threshold amount of a data analysis process was performed during a particular processing time interval. For example, the data processing system 235 stores a set of values at 12-hour intervals describing states of various data items on which at least five percent of a data analysis process was performed during a processing time interval prior to a time when the set of values is stored. In some embodiments, after a data item is processed by a data processing element of the data processing system 235, the online system 140 stores the data item in its fully processed state for further analysis or other use, in various embodiments. For example, the online system 140 stores fully processed data items in the data store 230 and generates metrics describing the effectiveness of content items described by the fully processed data items at influencing user interactions with the content items.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, or BlackberryOS.

Detecting Data Loss or Data Corruption During a Specified Time Interval

Figure 3:
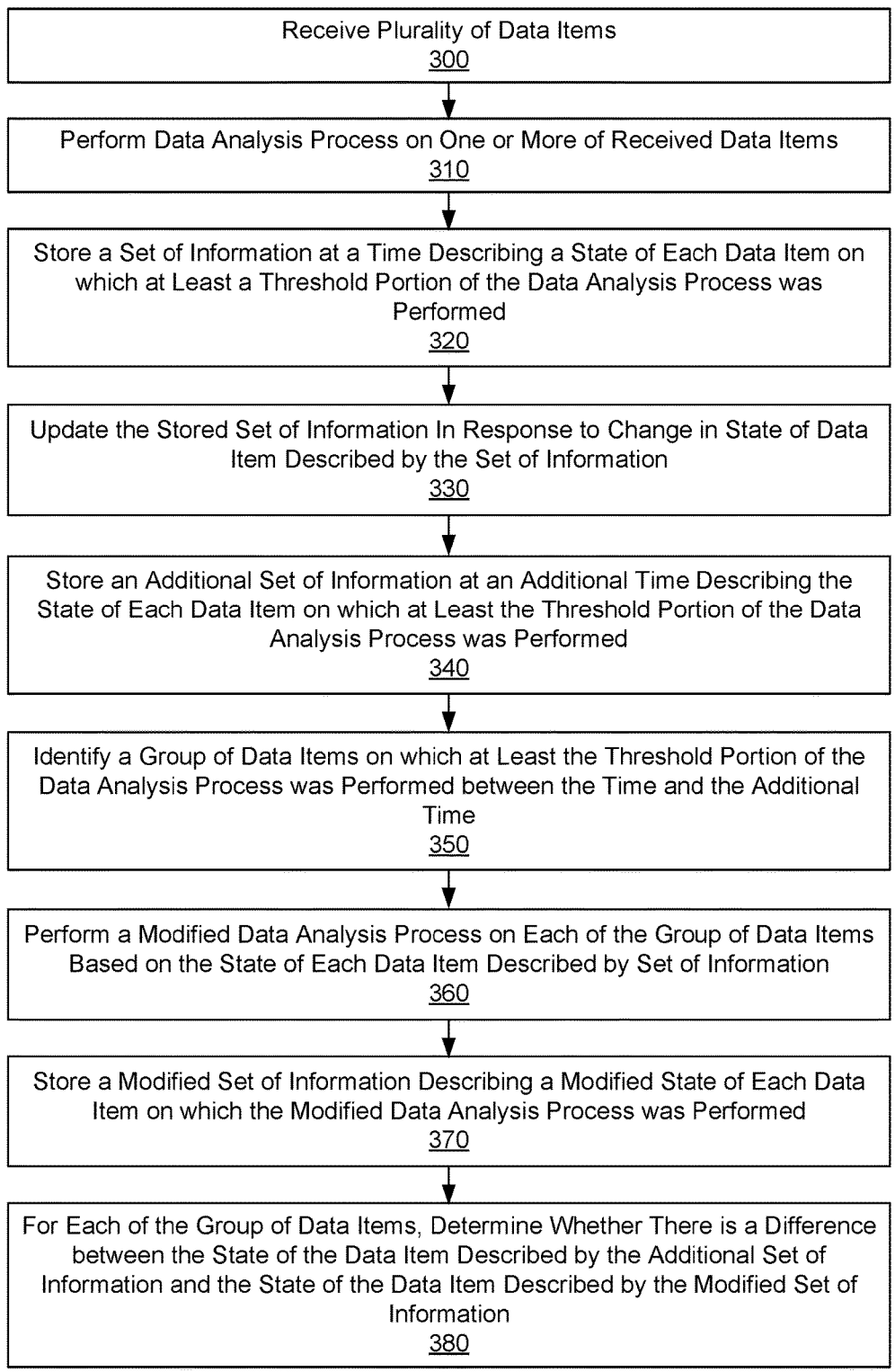
FIG. 3 is a flowchart of a method for detecting data loss or corruption of data processed by a data processing system of an online system during a specified time interval, in accordance with an embodiment.

FIG. 3 is a flowchart of one embodiment of a method for detecting data loss or corruption of data processed by a data processing system 235 of an online system 140 during a specified time interval. In other embodiments, the method may include different and/or additional steps than those shown in FIG. 3. Additionally, steps of the method may be performed in different orders than the order described in conjunction with FIG. 3 in various embodiments.

The online system 140 receives 300 a plurality of data items describing occurrences of one or more events associated with a content item presented to a user of the online system 140 and performs 310 a data analysis process on one or more of the plurality of data items. In various embodiments, the data items are received 300 by a distributed data processing system, such as the data processing system 235 further described above in conjunction with FIG. 2, of the online system 140 that performs 310 one or more operations of a data analysis process to analyze the data items. For example, the data items are received 300 at an input of a data processing pipeline that performs 310 a series of operations on the data items to generate one or more metrics describing performance of content items presented to users of the online system 140. Example operations performed 310 on the data items include: extracting, analyzing, organizing, and storing information included in the data items.

In various embodiments, the one or more events described by the plurality of data items include interactions that occur between an online system user and a content item presented to the user. A data item may describe a frequency with which or a number of times an online system user accessed certain content items presented to the user during various time intervals or a frequency with which or a number of times the user accessed websites or other content associated with the content items after being presented with the content items. For example, a data item describes a number of times a user clicks, hovers, or taps on a link included in a content item presented by the online system 140 or by a third party system 130 in a display area of a client device 110.

In one embodiment, the online system 140 receives 300 data items from a third party system 130 describing content items presented to users of the online system 140 by the third party system 130 and interactions of the users with the content items or with websites associated with the content items. In another embodiment, the online system 140 receives 300 data items from one or more third party systems 130 describing purchases of products or services by one or more users of the online system 140 within a threshold interval of time from a time when a user is presented with a content item associated with the products or services. The data items may be received 300 from a third party system 130, such as an ad server, a game server, a mail server, a web server or another content server. Similarly, the data items may be received from one or more components of the online system 140. Hence, the data items may be received from any source or combination of sources internal to or external to the online system 140 that captures data associated with presentation of content to users of the online system 140.

In various embodiments, data items are received 300 by the online system 140 and stored (e.g., in the data store 230) along with information describing a time when the online system 140 received 300 each data item, allowing the online system 140 to track times when various data items were received 300. For example, the online system 140 associates a timestamp with each data item describing a time when a data item is received 300 by a data processing system of the online system 140 and stores the timestamp along with the data item. Alternatively, the online system 140 stores received data items along with information describing a time when the online system 140 began applying a data analysis process to the data items. The online system 140 may also generate a unique data item identifier for each received data item and store the unique data item identifier with a received data item to track data items as they are processed by various components of a data processing system 235 of the online system 140.

The data analysis process performed 310 on the received data items by the online system 140 comprises various operations that may be executed by one or more data processing elements of a data processing system 235 of the online system 140. For example, the data analysis process is performed 310 by a distributed data processing system that may on different computing devices or in different locations. For example, operations of the data analysis process are performed 310 by a data processing pipeline comprising a plurality of data processing elements that each apply one or more operations of the data analysis process to a data item. Example operations performed on the received data items by one or more data processing elements of the data processing system 235 include: accessing the data items, reading the data items, analyzing the data items, validating the data items, converting the data items, organizing the data items, summarizing the data items, aggregating the data items, interpreting the data items, presenting the data items, and storing the data items.

In various embodiments, one or more operations of the data analysis process alter a state of the data item. For example, an operation that extracts a particular type of information from a data item changes a state of the data item by extracting the particular type of information. If a state of a data item is altered by the data analysis process, the data processing system 235 may generate a value associated with an altered state of the data item and associate the value with the altered state of data item, in some embodiments. For example, an operation that validates a data item alters a state of the data item and associates a value with the data item corresponding to the altered state of the data item. Similarly, an operation that converts a format of the data item alters another state of the data item and associates a format value with the data item corresponding to the altered other state of the data item. The results of applying operations of the data analysis process to the data items are stored by the online system 140 for further processing or querying. For example, the online system 140 may generate various reports based on application of various operations of the data analysis process to the data items. A report may include one or more metrics describing the performance of content presented on the online system 140.

In some embodiments, the data processing system 235 of the online system 140 performs 310 the data analysis process in real time (e.g., as the data items are received 300) to expedite processing of the data. Alternatively, the data processing system 235 performs 310 the data analysis process at pre-determined time intervals or upon the occurrence of certain events (e.g., upon receipt of a query or request for information about content items described by the data items). In various embodiments, the data analysis process is performed 310 during one or more processing time intervals. For example, the online system 140 divides a period of time during which the plurality of data items is received 300 into a plurality of consecutive processing time intervals and performs 310 one or more operations of the data analysis process during each processing time interval.

In some embodiments, the data analysis process is performance 310 on a data item during a single processing time interval. Alternatively, the data analysis process is performed 310 over a period including more than one processing time interval. For example, the online system 140 divides a 24-hour period of time when the plurality of data items is received 300 into two 12-hour processing time intervals. During one of the 12-hour processing time intervals, the online system 140 performs 310 the data analysis process on data items received during the 12-hour processing time interval. Similarly, during the other processing time interval, the online system 140 performs 310 the data analysis process or data items received during the other 12-hour processing time interval. As an additional example, if the data processing system 235 is a data processing pipeline comprising four data processing elements that each perform 310 an operation of the data analysis process on a received data item, the online system 140 divides a 1-hour period of time when the plurality of data items is received 300 into four 15-minute processing time intervals. Each data processing elements applies an operation of the data analysis process to a received data item during a 15-minute processing time interval and passes the data item to the next data processing module of the data processing pipeline, which applies an additional operation of the data analysis process to the data item during a subsequent 15-minute processing time interval. Hence, in various embodiments, application of one or more operations of the data analysis process during one or more processing time intervals modifies a state of each data item on which the data analysis process is performed 310.

To monitor a state of each data item on which one or more operations of the data analysis process is performed 310 during a processing time interval, the online system 140, at a time, stores 320 a set of information describing a state of each data item on which at least a threshold portion of the data analysis process was performed 310 during the processing time interval. For example, if at least one percent of the operations comprising the data analysis process performed 310 during a processing time interval have been applied to a data item received 300 during the processing time interval, the online system 140 stores 320 a set of information identifying the data item and a value associated with a state of the data item by the data processing system 235 at a time when at least one percent of the operations comprising the data analysis process have been applied to the data item.

In various embodiments, the stored set of information describing the state of each data item on which at least the threshold portion of the data analysis process was performed 310 may include an identifier of a data item on which at least the threshold portion of the data analysis process was performed 310, a timestamp indicating when the online system 140 received 300 the data item, a timestamp indicating a time when the set of information was stored 320, a portion of the data analysis process performed 310 on the data item at the time when the set of information was stored 320, a value associated with a state of the data item by the data analysis process at the time when the set of information was stored 320, and a copy of the data item at the time when the set of information was stored 320. In some embodiments, the set of information includes information describing a state of the data store 230 of the online system 140 after the data analysis process was fully applied to at least one data item that was received during a processing time interval prior to the time when the set of information was stored 320 and the at least one data item is stored in a data store 230. For example, the set of information is a copy of the data store 230 at a time when at least a threshold portion of the data analysis process has been applied to at least one data item received 300 during a processing time interval and the at least one data item has been stored in the data store 230 prior to the time when the set of information was stored 320.

To account for variations in an amount of time to perform 310 the data analysis process on various data items, the online system 140 updates 330 the stored set of information in response to determining a change in a state of a data item received 300 prior to the time when the set of information was stored 320 relative to the state of the data item described by the stored set of information. For example, if the data analysis process is being performed 310 on a data item at a time when the set of information is stored 320 and the state of the data item changes when the data analysis process is completed after the set of information was stored 320, the online system 140 updates 330 the set of information to include the changed state of the data item. The online system 140 may update 330 a value associated with a state of the data item, a portion of the data analysis process performed 310 on the data item, or any other information included in the set of information that changed relative to the state of the data item described by the set of information at the time when the set of information was stored 320.

In various embodiments, the online system 140 updates 330 the set of information to include a changed state of a data item if the state of the data item changes within a predetermined period after the time when the set of information was stored 320. The predetermined period may be based on an expected length of time for the data processing system 235 to perform 310 at least a threshold amount of the data analysis process on a data item after the data item is received 300 at the online system 140. For example, if the data processing system 235 performs at least the threshold amount of the data analysis process on a data item in an average of 30 minutes, the online system 140 updates 330 the set of information to include a changed state of a data item described by the set of information if the state changed within 30 minutes after the time when the online system 140 stored 320 the set of information. Data items to which the data analysis process is applied after the predetermined period are determined by the online system 140 to be lost by the data processing system 235 by the online system 140 or ore are not determined to be processed by the data processing system 235, in some embodiments. In other embodiments, if the set of information does not include a state of a data item, the online system 140 updates 330 the set of information to include a state of the data item if the data processing system 235 determines a state for the data item within the predetermined period after the data item is received 300 by the online system 140. For example, the online system 140 updates 330 the set of information to include a state of a data item that was not included in the set of information at the time when set of information was stored 320 if a timestamp associated with the data item indicates the data item was received 300 during a processing time interval occurring prior to the time when the set of information was stored 320 and the state of the data item changed within 30 minutes after the data item was received 300 by the online system 140. Similarly, the online system 140 updates 330 the set of information if the state of a data item changes relative to the state of the data item in the set of information within a predetermined period after the data item is received 300 by the online system 140.

Figure 4:
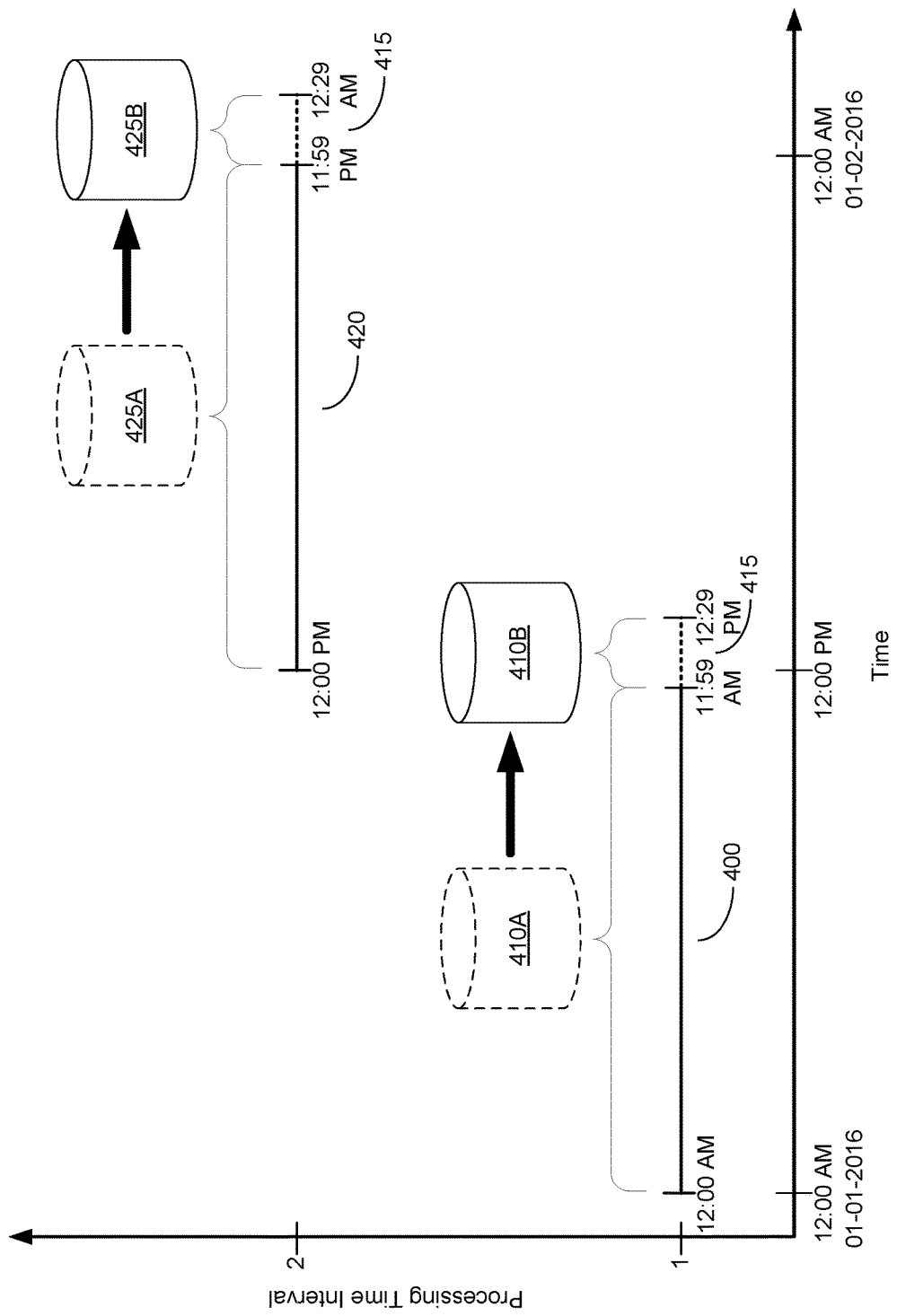
FIG. 4 illustrates processing time intervals during which the online system receives a plurality of data items, performs a data analysis process on the received data items, and stores a set and additional set of information describing states of the data items, in accordance with an embodiment.

Referring to an example shown by FIG. 4, the online system 140 performs 310 a data analysis process on a plurality of data items received 300 on Jan. 1, 2016. In the example of FIG. 4, the online system 140 divides a 24-hour period of time during which the plurality of data items were received 300 into a 12-hour processing time interval 400 and an additional 12-hour processing time interval 420. The online system 140 performs 310 the data analysis process on data items received 300 during the 12-hour processing time interval 400 occurring between 12:00 AM and 11:59 AM, and performs 310 the data analysis process on data items received 300 during the additional 12-hour processing time interval 420 occurring between 12:00 PM and 11:59 PM. At 11:59 AM, the online system 140 stores 320 a set of information 410A describing a state of each data item received 300 during the 12-hour processing time interval 400 on which the online system 140 performed 310 least a threshold portion of the data analysis process during the 12-hour processing time interval 400. In the example of FIG. 4 example, the online system 140 determines at least a threshold amount of the data analysis process is performed on a data item received 300 during the 12-hour processing time interval 400 in 30 minutes. Hence, the online system 140 maintains a predetermined time interval 415 of 30 minutes and updates the stored set of information 410A after the predetermined time interval 415 of 30 minutes lapses from 11:59 AM, when the set of information was stored 320. In the example of FIG. 4, the online system 140 updates 330 the stored set of information at 12:29 PM, causing the online system 140 to maintain an updated set of information 410B including updated states of data items received 300 during the 12-hour processing time interval 400 to which the data analysis process was fully applied within the pre-determined period 415 of 30 minutes after the set of information 410A was stored 320. The online system 140 determines data items to which at least the threshold amount of the data analysis process was not performed within the predetermined period 415 after the time when the set of information 410A was stored 320 were lost by the data processing system 235 or were not processed by the data processing system 235. Hence, the updated set of information 410B does not include information describing data items to which at least a threshold amount of the data analysis process was not applied within the predetermined period 415 after the time when the set of information 410A was stored 320. Hence, the online system 140 may periodically store 320 a set of information describing states of various data items when all data items received 300 during a processing time interval prior to a time when the online system 140 stores 320 the set of information have been processed at least a threshold amount by the data processing system 235.

At an additional time, which is later than the time when the set of information is stored 320, the online system 140 also stores 340 an additional set of information describing a state of each data item on which at least the threshold portion of the data analysis process was performed 310. For example, the additional time occurs a specified time interval after the time when the online system 140 stored 320 the set of information. In various embodiments, the additional set includes information describing states of data items received 300 during a processing time interval for which the set of information was stored 320 as well as information describing states of data items received 300 during an additional processing time interval occurring after the set of information is stored 320. For example, the set of information is a copy of the data store 230 at the time when the set of information is stored 320 and the additional set of information is an additional copy of the data store 230 at the additional time when the additional set of information is stored 340. In the preceding example, the additional copy of the data store 230 includes information describing states of data items received 300 during a processing time interval occurring before the time when the set of information was stored 320 and data items received 300 during another processing time interval after the time the set of information was stored 320 and before the additional time when the additional set of information was stored 340. Hence, the additional set of information includes information describing states of data items received 300 before the time when the set of information is stored 320 and up to the additional time when the additional set of information is stored 340.

In some embodiments, the additional time at which the online system 140 stores 340 the additional set of information is associated with an additional processing time interval when further operations of the data analysis process are applied to the data items (e.g., in a subsequent segment of a data processing pipeline that further processes data items after the time when the set of information is stored 320). Referring again to the example of FIG. 4, the data processing system 235 performs 310 a validation operation on data items received 300 during the 12-hour processing time interval 400 and performs 310 a conversion operation on the data items during the additional 12-hour processing time interval 420. In this example, the online system 140 stores 320 a set of information 410A describing a state of each data item on which the validation operation was after the first processing time interval 400 at 11:59 AM and also stores 340 an additional set of information 420A describing the state of each data item on which the conversion operation was performed at 11:59 PM, which is a time at the end of the additional 12-hour processing time interval 420. This allows the online system 140 to maintain information describing the state of various data items as data processing system 235 applies the data analysis process to the data items. Hence, the set of information 410A and the additional set of information 420A describe states of the data items at different times.

Information included in the additional set of information stored 340 by the online system 140 may include an identifier of a data item on which at least the threshold portion of the data analysis process was performed 310, a timestamp describing when the online system 140 received 300 the data item, a timestamp describing the additional time when the additional set of information was stored 340, a portion of the data analysis process performed 310 on the data item at the additional time, a value associated with a state of the data item by the data analysis process (which may be an updated value or a different value than a value stored 320 in the set of information), and a copy of the data item at the additional time, in some embodiments. Information included in the additional set of information may also include information describing a state of the data store 230 after the data analysis process was fully applied to at least one data item that was received 300 during a processing time interval prior to the additional time when the additional set of information was stored 340 and the at least one data item is stored in a data store 230.

In various embodiments, the online system 140 also updates the additional set of information in response to determining a change of a state of a data item received 300 at a time prior to the additional time relative to the state of the data item described by the additional set of information.

For example, the online system 140 updates the additional set of information to include a state of a data item that was not included in the additional set of information at the additional time when the additional set of information was stored 340 if a timestamp associated with the data item indicates the data item was received 300 during a processing time interval occurring prior to the additional time when the additional set of information was stored 340 and the state of the data item changed within a predetermined time interval after the data item was received 300 by the online system 140. Similarly, the online system 140 updates the additional set of information if the state of a data item changes relative to the state of the data item in the additional set of information within the predetermined period after the data item is received 300 by the online system 140. In other embodiments, the online system 140 updates the additional set of information if a state of a data item changes within a predetermined period after the additional time when the additional set of information was stored 340.

Returning to the example of FIG. 4, the online system 140 performs 310 the data analysis process during the 12-hour processing time interval 400 between 12:00 AM and 11:59 AM on data items received 300 during the 12-hour processing time interval 400 and also performs 310 the data analysis process during an additional 12-hour processing time interval 420 occurring between 12:00 PM and 11:59 PM on data items received 300 during the additional 12-hour processing time interval 420. At 11:59 AM, which is the end of the 12-hour processing time interval 400, the online system 140 stores 320 the set of information 410A describing a state of each data item received 300 during the 12-hour processing time interval 400 on which at least a threshold portion of the data analysis process was performed 310. As further described above, the online system 140 updates 330 the stored set of information 410A after the predetermined time interval 415, so updated set of information 410B including changes in states of data items received 300 during the 12-hour processing time interval 400 occurring within the predetermined time interval 415 of 30 minutes after the end of the 12-hour processing time interval 400.

Similarly, at 11:59 PM, which is the end of the additional 12-hour processing time interval 420, the online system 140 stores 340 an additional set of information 425A describing the state of each data item received 300 during the additional 12-hour processing time interval 420 on which at least the threshold portion of the data analysis process was performed 310 during the additional 12-hour processing time interval 420. The online system 140 updates 330 the additional stored set of information 425A at the end of the predetermined period 415 following the additional 12-hour processing time interval 420 to generate an updated additional stored set of information 425B including changes in states of data items received 300 during the additional 12-hour processing time interval 42 to which the data analysis process was fully applied within the pre-determined period 415 of 30 minutes after the additional set of information 425A was stored 340.

In the example of FIG. 4, the updated additional set of information 425B includes information describing a state of each data item received 300 during the 12-hour processing time interval 400 on which at least the threshold portion of the data analysis process was performed 310 and information describing a state of each data item received 300 during the additional 12-hour processing time interval 420 on which at least the threshold portion of the data analysis process was performed 310. For example, the updated additional set of information 425B is a copy of the data store 230 at the additional time when the additional set of information 425A is stored 340, so the updated additional set of information 425B includes a copy of each data item received 300 during the day of Jan. 1, 2016 that has been stored in the data store 230 along with information describing the state of each data item at the time when the set of information 410A was stored 320 and the state of each data item at the additional time when the additional set of information 425A was stored 340. Hence, the updated set of information 410B and the updated additional set of information 425B describe states of the data items at different times, allowing the online system 140 to maintain information describing the various states of the data items as they are modified by the data processing system 235 over time.

In various embodiments, the online system 140 identifies 350 a group of data items of the plurality of data items on which at least the threshold portion of the data analysis process was performed 310 between the time when the set of information was stored 320 and the additional time when the additional set of information was stored 340. For example, if the online system 140 identifies an error in the data analysis process that may have affected a state of one or more data items on which the data analysis process was performed 310 during a processing time interval between the time and the additional time, the online system 140 identifies 350 a group of data items on which at least the threshold portion of the data analysis process was performed 310 between the time and the additional time.

The online system 140 identifies 350 the group of data items based on information included in the stored set of information and in the additional set of information. For example, the online system 140 identifies 350 a data item on which at least the threshold portion of the data analysis process was performed 310 between the time and the additional time as a data item associated with a data item identifier in the additional set of information indicating at least the threshold portion of the data analysis process was performed 310 on the data item between the time and the additional time. Other information included in the set and the additional set from which the online system 140 may identify 350 a data item on which at least the threshold portion of the data analysis process was performed 310 between the time when the set was stored 320 and the additional time when the additional set was stored 340: includes a timestamp describing when the online system 140 received 300 the data item, a timestamp describing the time when the set describing the state of the data item was stored 320, a timestamp describing when the additional set of information describing the state of the data item was stored 340, a portion of the data analysis process performed 310 on the data item at the time or at the additional time, a value associated with a state of the data item by the data analysis process at the time or at the additional time, and a copy of the data item at the time or at the additional time.

The online system 140 may also identify 350 an additional group of data items described by the set of information but not described by the additional set of information. Data items of the additional group are data items on which at least the threshold portion of the data analysis process was not performed between the time and the additional time. For example, data items of the additional group are data items that have been lost by the data processing system 235. For example, the online system 140 identifies 350 a lost data item as a data item for which the set of information includes a state and for which the additional set of information does not include the state. The preceding example indicates the data item was received 300 before the time when the set of information was stored 320 but at least the threshold portion of the data analysis process was not performed on the data item because the additional set of information does not include information describing the state of the data item. Hence, the online system 140 may determine the data analysis process was not performed on data items having a state identified by the set of information but not having a state identified by the additional set of information.

The online system 140 performs 360 a modified data analysis process on each data item of the group of data items based on the state of each data item of the group of data items described by the set of information. For example, if the online system 140 detects an error in the data analysis process affecting a state of data items on which the data analysis process was performed 310 between the time and additional time, the online system 140 modifies the data analysis process to correct the detected error and performs 360 the modified data analysis process on the group of data items to which the data analysis process was applied between the time and additional time. Similarly, if the online system 140 identifies 350 an additional group of data items described by the set of information and not described by the additional set of information, the online system 140 also performs 360 the modified data analysis process on each data item of the additional group of data items based on the state of each of the additional group of data items described by the set of information.

In various embodiments, the modified data analysis process comprises one or more repaired operations of the data analysis process that modify a state of each data item on which the modified data analysis process is performed 360. If a state of a data item is altered by the modified data analysis process, the data processing system 235 generates a value associated with the altered state of the data item and associates the value with the altered state of data item. For example, an operation of the modified data analysis process that aggregates information included in a data item alters a state of the data item and associates an aggregation value corresponding to the altered state with the data item. Example operations performed by the modified data analysis process include: accessing a data item of the group or of the additional group of data items, reading the data item, analyzing the data item, validating the data item, converting the data item, organizing the data item, summarizing the data item, aggregating the data item, interpreting the data item, presenting the data item, and storing the data item.

In some embodiments, the online system 140 retrieves a state of each data item of the group or of the additional group of data items from the set of information and performs 360 the modified data analysis process on the data item based on the retrieved state of the data item. For example, if the online system 140 performs 360 the modified data analysis process to correct an error in the data analysis process affecting the state of a data item described by the additional set of information, the online system 140 performs 360 the modified data analysis process on a copy of the data item that was stored 320 in the set of information at a time before the error in the data analysis process affected the state of the data item. Hence, the online system 140 re-processes a copy of the data item stored before the state of the data item was affected by the error in the data analysis process, so application of modified data analysis process to the data item is not affected by the error in the data analysis process initially applied to the data item.

The online system 140 stores 370 a modified set of information describing a modified state of each data item on which at least a threshold portion of the modified data analysis process was performed 360. In various embodiments, information included in the modified set of information includes an identifier of a data item on which at least the threshold portion of the modified data analysis process was performed 360, a timestamp describing when the online system 140 received 300 the data item, a timestamp describing when the modified set of information was stored 360, a portion of the modified data analysis process performed 360 on the data item, a value associated with a modified state of the data item by the modified data analysis process, and a copy of the data item when the modified set of information was stored 360. If the modified data analysis process was performed on an additional group of data items described by the set of information and not described by the additional set of information, the online system 140 stores 370 an additional modified set of information describing a modified state of each data item of the additional group of data items on which at least a threshold portion of the modified data analysis process was performed 360. In other embodiments, the online system 140 stores 370 information describing the modified state of each data item of the additional group of data items in the modified set of information, rather than in an additional modified set of information. In yet other embodiments, the modified set of information describes a state of the data store 230 after the modified data analysis process was fully applied to at least one data item of the group of data items or of the group of additional group of data items d and the at least one data item is stored in a data store 230. Hence, the online system 140 stores 370 a modified set of information including information describing a modified state of one or more data items on which the modified data analysis process was performed 360.

For each data item of the group of data items, the online system 140 compares the state of the data item described by the additional set of information (stored at the additional time that is later than the time when the set of information was stored 320) and the modified state of the data item described by the modified set of information and determines 380 whether the state differs from the modified state. For example, the online system 140 retrieves a value associated with the state of a data item from the additional set of information and an alternative value associated with the modified state of the data item from the modified set of information and compares the value and alternative value. Based on the comparison, the online system 140 determines 380 the state differs from the modified state if the value differs from the alternative value. The online system 140 also performs 360 the modified data analysis process on an additional group of data items that are not described by the additional set of information, if the online system 140 identified the additional group of data items. If application of the modified data analysis process results in value of a state of a data item of the additional group while the additional set does not include a value for the state of the data item of the additional group, the online system 140 determines the modified data analysis process results in a different state for the data item of the additional group than the data analysis process.

If the online system 140 determines 380 a difference between the state and the modified state of a data item, the online system 140 may determine the data item was lost or corrupted (i.e., erroneously altered) by the data processing system 235 and apply one or more operations of the data analysis process to the data item after correcting an error in one or more operations that caused the loss or corruption, in some embodiments. For example, if a difference between a value associated with a state of a data item described by the additional set of information and an alternative value associated with the modified state of the data item by the modified data analysis process is non-zero, the online system 140 determines the data item was corrupted by an operation of the data analysis process applied to the data item between the time when the set was stored 320 and the additional time when the additional set was stored 340. In this example, the online system 140 corrects an error in the operation that caused corruption of the data item and applies the corrected operation to a copy of the data item retrieved from the set of information stored 320 at the time, allowing the data analysis process to be re-applied to the data item so the resulting state state of the data item is not affected by the error in the operation. Similarly, the online system 140 may re-apply the data analysis process after correcting one or more operations to data items of the additional group of data items for which a difference between the state of the data item and the modified state of the data item is non-zero, allowing the online system 140 to perform 310 the data analysis process, after correcting one or more operations, on data items on which at least the threshold portion of the data analysis process was not previously performed.

In certain embodiments, the online system 140 generates a value based at least in part on a determined difference between the state of a data item described by the additional set of information and the modified state of the data item and associates the generated value with the data item. For example, if a value associated with a data item by the data analysis process at the additional time and an alternative value associated with the data item by the modified data analysis process differs by a value of two, the online system 140 generates an identifier-value pair that associates an identifier of the data item with the value of two. Hence, the online system 140 generates pairings of identifiers and values associating information identifying a data item with a difference between the state of the data item described by the additional set of information and the modified state of the data item.

Based at least in part on the generated value associated with a data item, the online system 140 may alter a state of each data item for which application of the modified data analysis process resulted in a modified state differing from a state described by the additional set of information. For example, if the online system 140 generates an identifier-value pair for a data item, the online system 140 retrieves a value associated with the data item described by the identifier from the additional set of information and applies the value paired with the identifier to the retrieved value. In the preceding example, the online system 140 applies the value of two paired with an identifier of the data item to the value retrieved from the additional set of information for the data item to update the retrieved value. In the preceding example, the updated value is a corrected value that would have been described by the additional set of information stored 340 at the additional time the data analysis process did not include an error affecting the state of the data item. Hence, pairing the difference between the state of a data item described by the additional set of information and the modified state of the data item with an identifier of the data item allows the online system 140 to correct for an error in the data item's state arising from performing 310 the data analysis process during a processing time interval between the time and additional time.

In some embodiments, the generated value based on a determined difference between the state of a data item described by the additional set of information and the modified state of the data item associated with a data item is applied to a subsequent value associated with a subsequent state of the data item stored after the additional time (e.g., after the data item has been fully processed by the data processing system 235). For example, to correct an error in a state of a data item associated with an identifier-value pair, the online system 140 retrieves a stored value of a subsequent state of the data item stored after the additional time and applies the value from the identifier-value pair to the stored value of the subsequent state. In other embodiments, the online system 140 applies an operation of the data analysis process to the generated value associated with a data item in an identifier-value pair and stores a result of application of the operation to the generated value from the identifier-value pair in association with the data item. For example, the online system 140 applies a formatting operation to the generated value from an identifier-value pair and stores a format value describing a result of application of the formatting operation to the generated value of the identifier-value pair in association with the data item identified by the identifier of the identifier-value pair. In the preceding example, the online system 140 retrieves and applies the stored format value to a value associated with a subsequent state of the data item stored after the additional time to correct an error in a format state of the data item from an error in the data analysis process performed between the time and additional time. Hence, the online system 140 corrects errors in states of data items occurring from performing 310 an operation of the data analysis process during a particular processing time interval.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, at an online system, a plurality of data items describing one or more events associated with a content item presented to a user of the online system;
   performing a data analysis process on one or more of the plurality of data items;
   storing a set of information at a time describing a state of each data item on which at least a threshold portion of the data analysis process was performed;
   responsive to determining a change in the state of a data item received prior to the time when the set of information was stored, updating the stored set of information to include a changed state of the data item;
   storing an additional set of information at an additional time later than the time when the set of information was stored, the additional set of information describing the state of each data item on which at least the threshold portion of the data analysis process was performed;
   identifying a group of data items of the plurality of data items on which at least the threshold portion of the data analysis process was performed between the time when the set of information was stored and the additional time when the additional set of information was stored;
   performing a modified data analysis process on each data item of the group of data items based on the state of each data item of the group of data items described by the set of information;
   storing a modified set of information describing a modified state of each data item of the group of data items on which the modified data analysis process was performed; and
   determining a difference between the state of each data item of the group of data items described by the additional set of information and the modified state of each data item of the group of data items described by the modified set of information.

2. The method of claim 1, further comprising:
   generating a value based at least in part on the difference between the state of a data item of the group of data items described by the additional set of information and the modified state of the data item of the group of data items described by the modified set of information; and
   modifying the state of the data item of the group of data items described by the additional set of information based at least in part on the generated value.

3. The method of claim 1, further comprising:
   identifying an additional group of data items of the plurality of data items for which the set of information describes the state at the time and for which the additional set of information does not describe the state at the additional time;
   performing the modified data analysis process on each data item of the additional group of data items based at least in part on the state of each data item of the additional group of data items described by the set of information;
   storing an additional modified set of information describing a modified state of each data item of the additional group of data items on which the modified data analysis process was performed; and
   determining a difference between the state of each data item of the additional group of data items not described by the additional set of information and the modified state of each data item of the additional group of data items described by the additional modified set of information.

4. The method of claim 1, further comprising:
   responsive to determining a change in the state of an additional data item of the plurality of data items received prior to the additional time when the additional set of information was stored has occurred, updating the stored additional set of information to include a changed state of the additional data item.

5. The method of claim 1, wherein the set of information or the additional set of information further describes a state of a data store after the data analysis process has been fully applied to at least one data item received before the time when the set of information was stored and the at least one data item was stored in the data store.

6. The method of claim 1, wherein the content item comprises sponsored content received by the online system.

7. The method of claim 1, wherein the one or more events comprise interactions between the user of the online system and the content item presented to the user of the online system.

8. The method of claim 1, wherein the one or more events are selected from a group consisting of: accessing the content item by the user of the online system, presenting the content item in a display area of a client device associated with the user of the online system, purchasing a product associated with the content item by the user of the online system, purchasing a service associated with the content item by the user of the online system, and any combination thereof.

9. The method of claim 1, wherein the online system comprises a distributed data processing system configured to perform the data analysis process in real time.

10. The method of claim 1, wherein performing the modified data analysis process on each data item of the group of data items comprises:
    detecting an error in the data analysis process that affects the state of at least one data item of the group of data items on which at least the threshold portion of the data analysis process was performed between the time when the set of information was stored and the additional time when the additional set of information was stored;
    modifying the data analysis process to correct the detected error; and performing the modified data analysis process on each data item of the group of data items.

11. A computer program product comprising a non-transitory computer readable storage medium having instructions encoded thereon that, when executed by a processor, cause the processor to:
receive, at an online system, a plurality of data items describing one or more events associated with a content item presented to a user of the online system;
perform a data analysis process on one or more of the plurality of data items;
store a set of information at a time describing a state of each data item on which at least a threshold portion of the data analysis process was performed;
responsive to determining a change in the state of a data item received prior to the time when the set of information was stored, update the stored set of information to include a changed state of the data item;
store an additional set of information at an additional time later than the time when the set of information was stored, the additional set of information describing the state of each data item on which at least the threshold portion of the data analysis process was performed;
identify a group of data items of the plurality of data items on which at least the threshold portion of the data analysis process was performed between the time when the set of information was stored and the additional time when the additional set of information was stored;
perform a modified data analysis process on each data item of the group of data items based on the state of each data item of the group of data items described by the set of information;
store a modified set of information describing a modified state of each data item of the group of data items on which the modified data analysis process was performed; and
determine a difference between the state of each data item of the group of data items described by the additional set of information and the modified state of each data item of the group of data items described by the modified set of information.

12. The computer program product of claim 11, wherein the non-transitory computer readable storage medium further has instructions encoded thereon that, when executed by the processor, cause the processor to:
generate a value based at least in part on the difference between the state of a data item of the group of data items described by the additional set of information and the modified state of the data item of the group of data items described by the modified set of information; and
modify the state of the data item of the group of data items described by the additional set of information based at least in part on the generated value.

13. The computer program product of claim 11, wherein the non-transitory computer readable storage medium further has instructions encoded thereon that, when executed by the processor, cause the processor to:
identify an additional group of data items of the plurality of data items for which the set of information describes the state at the time and for which the additional set of information does not describe the state at the additional time;
perform the modified data analysis process on each data item of the additional group of data items based at least in part on the state of each data item of the additional group of data items described by the set of information;
store an additional modified set of information describing a modified state of each data item of the additional group of data items on which the modified data analysis process was performed; and
determine a difference between the state of each data item of the additional group of data items not described by the additional set of information and the modified state of each data item of the additional group of data items described by the additional modified set of information.

14. The computer program product of claim 11, wherein the non-transitory computer readable storage medium further has instructions encoded thereon that, when executed by the processor, cause the processor to:
responsive to determining a change in the state of an additional data item of the plurality of data items received prior to the additional time when the additional set of information was stored has occurred, update the stored additional set of information to include a changed state of the additional data item.

15. The computer program product of claim 11, wherein the set of information or the additional set of information further describes a state of a data store after the data analysis process has been fully applied to at least one data item received before the time when the set of information was stored and the at least one data item was stored in the data store.

16. The computer program product of claim 11, wherein the content item comprises sponsored content received by the online system.

17. The computer program product of claim 11, wherein the one or more events comprise interactions between the user of the online system and the content item presented to the user of the online system.

18. The computer program product of claim 11, wherein the one or more events are selected from a group consisting of: accessing the content item by the user of the online system, presenting the content item in a display area of a client device associated with the user of the online system, purchasing a product associated with the content item by the user of the online system, purchasing a service associated with the content item by the user of the online system, and any combination thereof.

19. The computer program product of claim 11, wherein the online system comprises a distributed data processing system configured to perform the data analysis process in real time.

20. The computer program product of claim 11, wherein perform the modified data analysis process on each data item of the group of data items comprises:
detect an error in the data analysis process that affects the state of at least one data item of the group of data items on which at least the threshold portion of the data analysis process was performed between the time when the set of information was stored and the additional time when the additional set of information was stored;
modify the data analysis process to correct the detected error; and
perform the modified data analysis process on each data item of the group of data items.

* * * * *